June 2, 1953
A. E. KULBERG ET AL
2,640,509
FILAMENT MOUNTING APPARATUS
Filed March 11, 1949
5 Sheets-Sheet 1
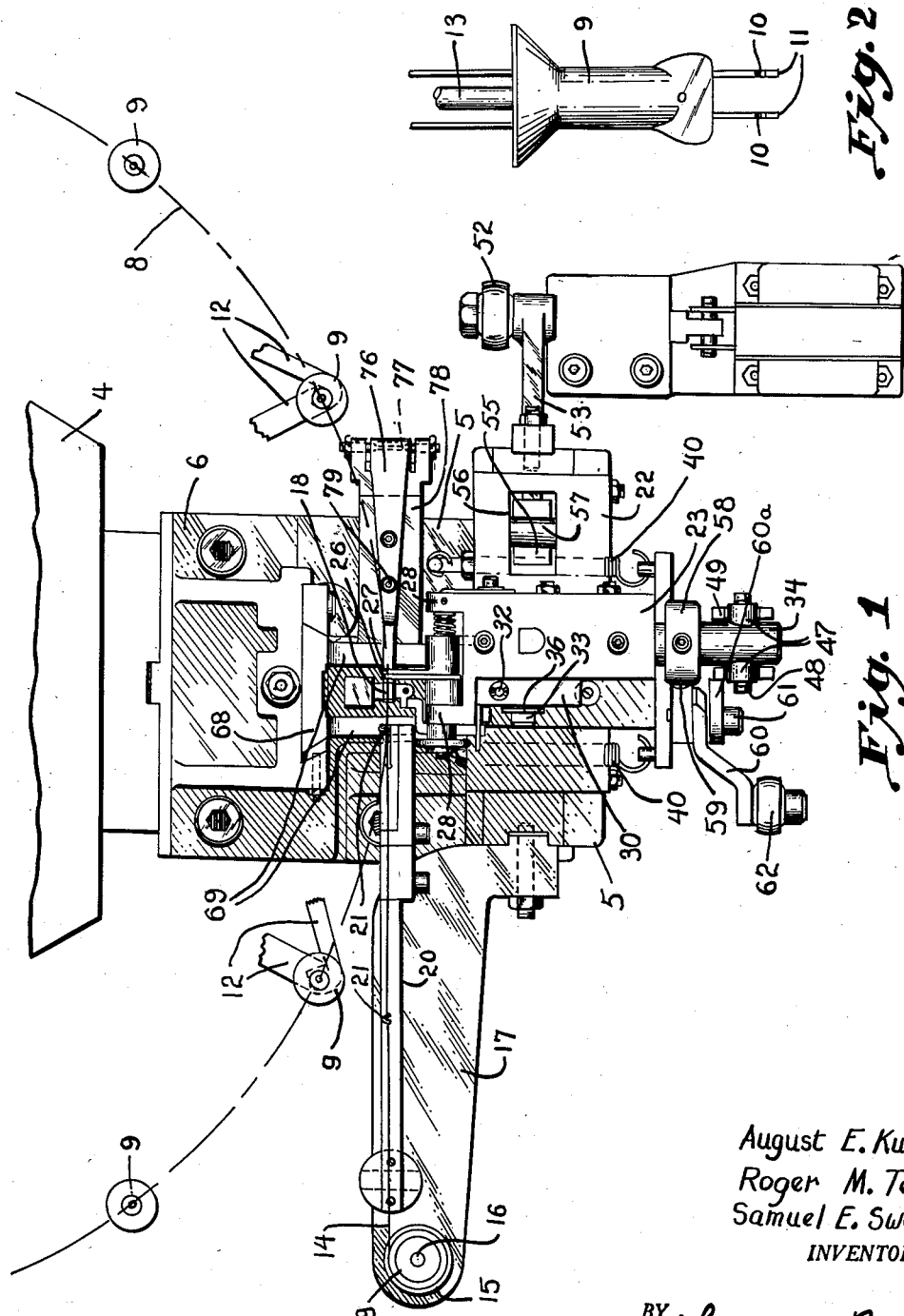
August E. Kulberg
Roger M. Terry
Samuel E. Swasey
INVENTORS
BY Lawrence Burm,
ATTORNEY

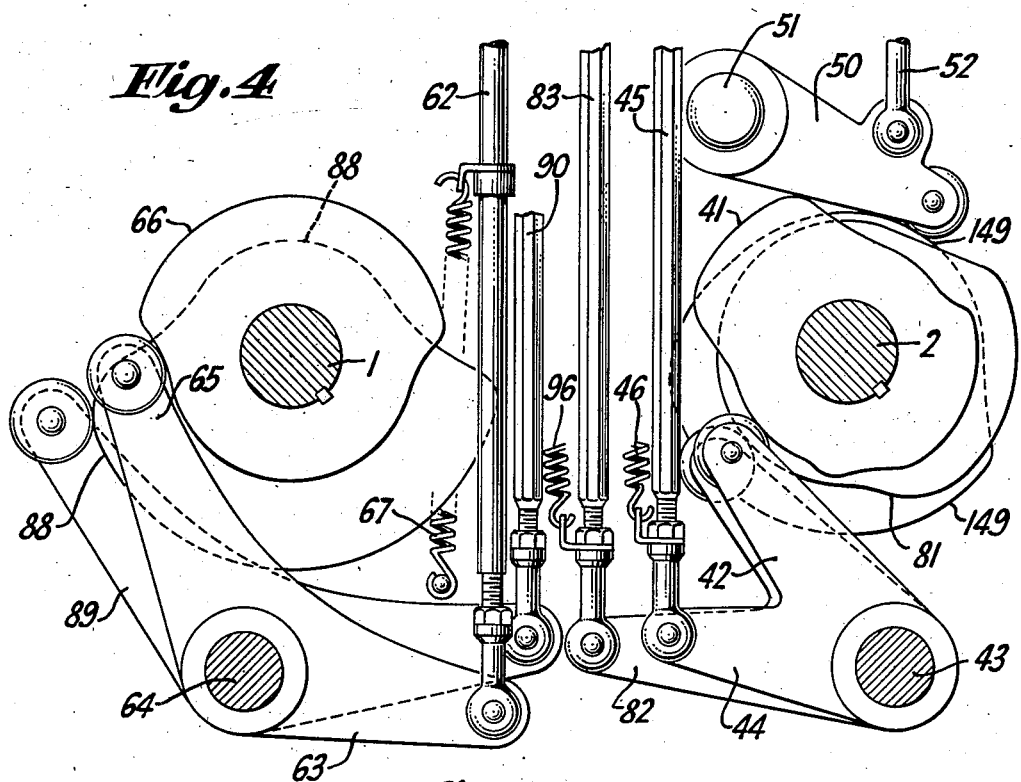
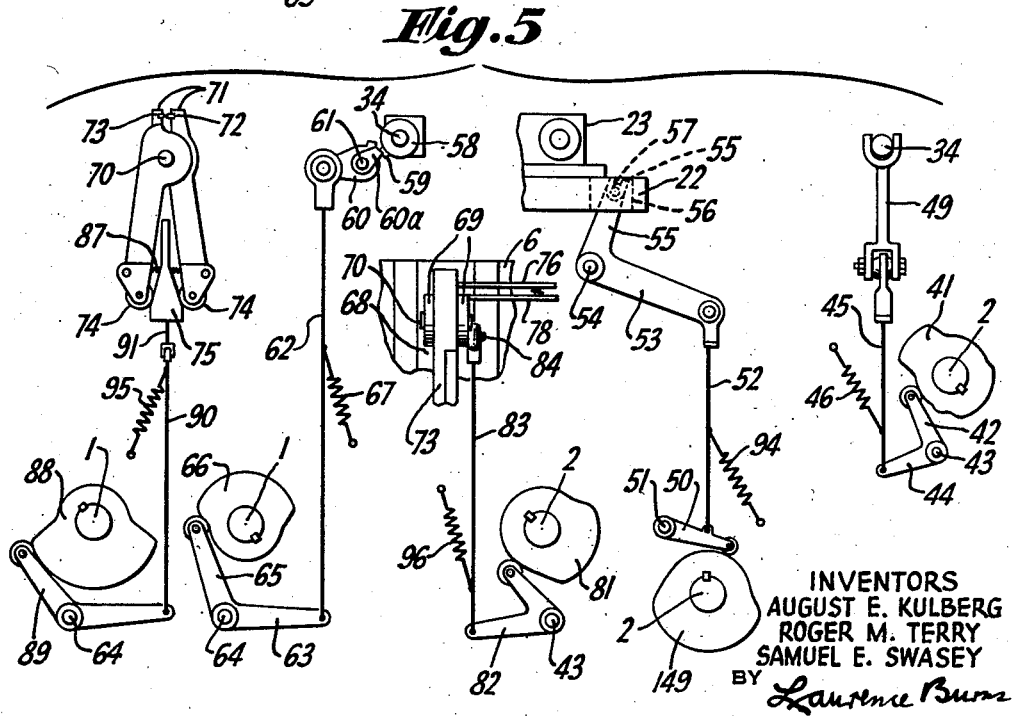

August E. Kulberg
Roger M. Terry
Samuel E. Swasey
INVENTORS

BY Lawrence Burns,
ATTORNEY

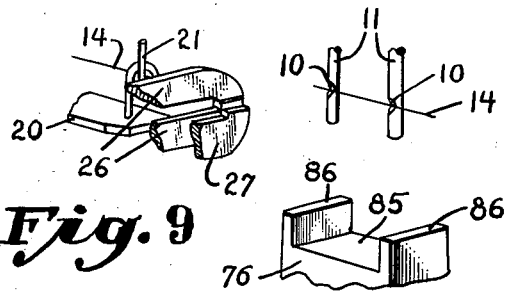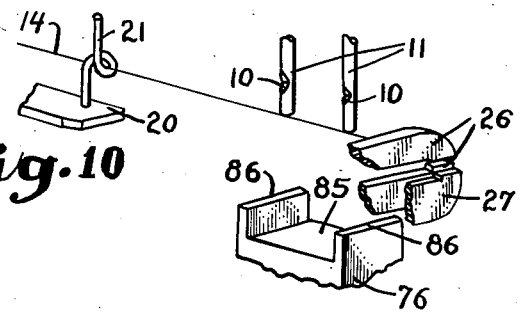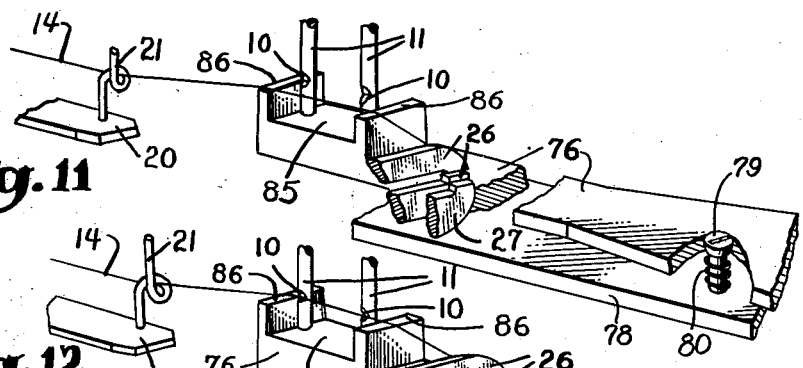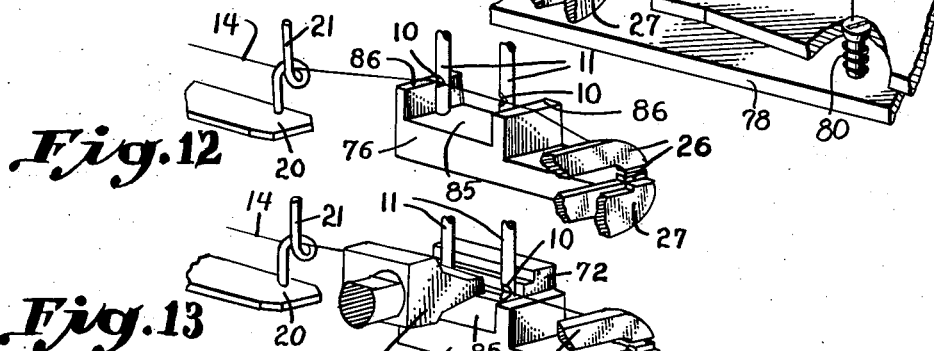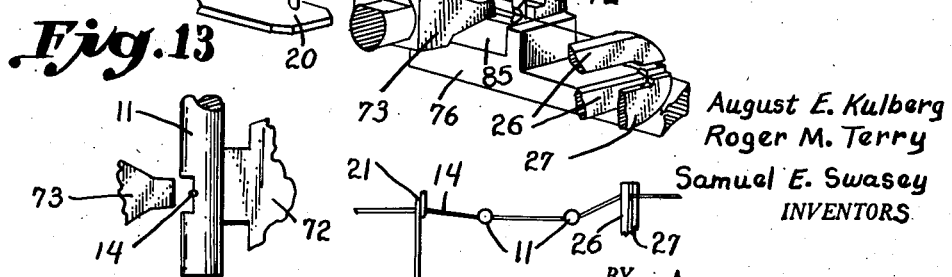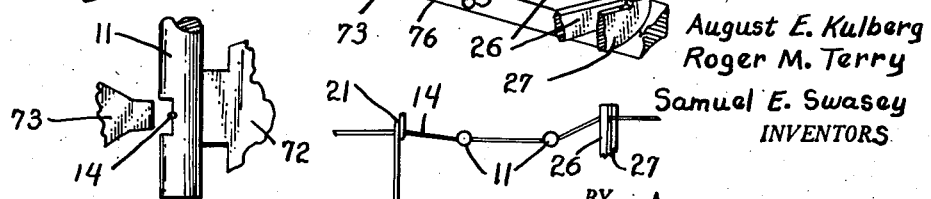

Patented June 2, 1953

2,640,509

UNITED STATES PATENT OFFICE 2,640,509

FILAMENT MOUNTING APPARATUS

August E. Kulberg, Beverly, Roger M. Terry, Ipswich, and Samuel E. Swasey, Marblehead, Mass., assignors to Sylvania Electric Products Inc., Salem, Mass., a corporation of Massachusetts Application March 11, 1949, Serial No. 80,826

4 Claims. (Cl. 140—71.6)

This invention relates to apparatus for mounting a filament upon the lead wires of lamp stem assemblies and particularly to such apparatus for mounting very fine wire filaments such as used in photographic flash lamps.

The invention provides a highly efficient mechanism which performs an automatic sequence of operations to draw a length of wire from a wire supply means, then accurately and positively positions the filament in staking position with respect to the lead wires. The staking operation is then executed and finally the staked wire is severed from the wire supply means to complete the operation.

The various operations involved are executed while continuously maintaining positive control of the wire thus insuring reliable and accurate operation.

An object of the invention is to provide a filament mounting mechanism which functions with a high degree of precision.

A further object of the invention is to provide a mechanism which will consistently produce stems having perfectly mounted filaments.

A further object of the invention is to provide a mechanism which will maintain a positive hold upon and manipulate an extremely delicate wire throughout the complete filament mounting operation without injury to or breakage of the wire.

A further object of the ivention is to provide a mechanism of the above stated character which will function efficiently at high productive speeds.

A further object of the invention is to provide a mechanism to mount a fine wire filament having low voltage operating characteristics and providing consistently uniform low resistance connections between the filament wire and its lead wires.

Other objects and features of the invention will appear from the following description and will be particularly pointed out in the claims.

To provide a better understanding of the invention a particular embodiment thereof will be described and illustrated in the accompanying drawings in which:

Fig. 1 is a plan view of the apparatus.

Fig. 2 is a general view of a stem assembly to which a filament is secured by the apparatus.

Fig. 4 is a general view of the cam assembly employed to drive the apparatus.

Fig. 5 is a diagrammatic view of the driving means for the various elements of the apparatus.

Figs. 9 through 13 are diagrammatic views illustrating the position of the elements of the apparatus at various times in the cycle of its operation.

Fig. 14 is a side view at enlarged scale showing the manner in which the metal of the lead wire is swaged upon the filament.

Fig. 15 is a plan view showing the position of the filament wire with respect to the lead wires at the time of the swaging operation.

Figure 3:
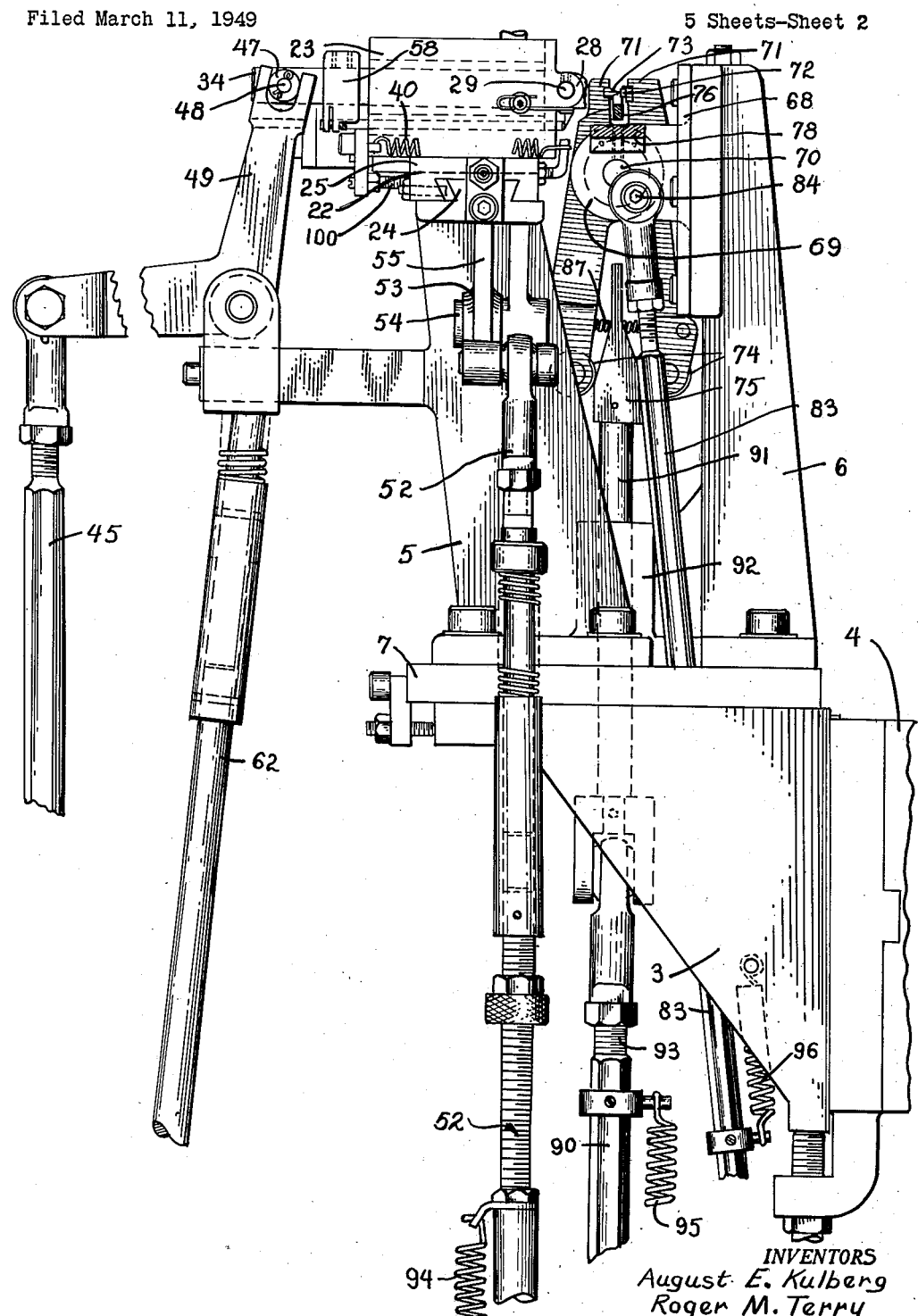
Fig. 3 is a side elevation of the upper portion of the apparatus.

A practical and efficient application of the invention is to apply it to an automatic lamp stem fabricating machine. Such an application is shown in the drawings annexed hereto. The mechanism embodying the invention is situated upon such a machine at the station next succeeding the station which has completed the stem with the exception of mounting a filament thereon. Desirably the elements of the invention may be driven from the cam shafts 1 and 2 of the fabricating machine. The device may however be operated independently in any suitable manner.

The two shafts 1 and 2 are rotatably mounted in the main frame of the fabricating machine and the invention is mounted upon a bracket 3 secured upon the platen member 4 of the main machine which is described in a copending application filed in the names of Gardner, Gartner and Barret, bearing the title Automatic Lamp Stem Fabricating Apparatus and Serial No. 637,440.

The main elements of the apparatus are supported upon a pair of rigid standards or frames 5 and 6 although they may be supported in any suitable manner. The standards are secured to the main bracket 3. Desirably the standards are mounted upon a bolster plate 7 which is arranged to provide for fine adjustment of the standards toward and from the path of movement of the stems as they are fed along successively into mounting position. Thus the mechanism of the invention may be accurately placed upon the correct path which in the form of the invention presented herein is indicated by the curved dash line 8 shown in Fig. 1. The curved path is occasioned by the location of the mechanism at the end of the stem fabricating machine where its conveyor passes over a sprocket in passing from a straight run on one side of the machine to its other straight run on the opposite side of the machine.

The completed stems 9 without filaments are shown in Figs. 1 and 2. The invention may be employed to mount filaments of various types. The embodiment presented herein however is adapted to mounting the extremely fine wire filament used to fire a photographic flash lamp. It is to be noted in this connection that the accuracy and efficiency of the invention makes it possible to automatically and consistently mount such filaments without breaking or fouling the wire and also securing the wire on the lead wires with a consistently low resistance and mechanically strong connection.

Desirably the filament is mounted in notches 10 in the lead wires 11. The lead wires are substantially straight and aligned upon a common plane with their notches a predetermined distance from their outer ends. The complete stem assemblies 9 are fed to their mounting position in the position they assume when they are completed by the fabricating machine, namely in a position reversed from normal operating position with the lead wires extending downward. The stems are held in position by pairs of clamping arms 12 which grip the stem by its exhaust tube 13 (Fig. 1).

The filament wire 14 is supplied from a spool 15 mounted to rotate upon a spindle 16 which in turn is fixed in the outer end of a supporting arm 17 which in turn is rigidly fastened to the standard 5. Any suitable means may be provided to set up a slight degree of friction upon the spool 15 to maintain the desired tension in the wire as it is fed to its mounting position 18. Such a tension may be provided by a weight 19 on the spool and a friction washer below the spool or any other suitable means.

Special means are provided to guide and protect the wire as it is fed from the spool to the mounting position. A guide arm 20 is pivoted at a point near the spool to swing in a horizontal plane, its inner end extending to a position near the mounting point 18. The arm is provided with eyelets 21 through which the wire is fed. The further specific function of the arm 20 will be described hereinafter.

The next portion of the apparatus which will be described is that which grips the end of the supply of wire and feeds a section thereof into approximate mounting position. The elements to perform this operation are mounted upon a pair of slides 22 and 23. The lower slide 22 is mounted directly upon the top of the support frame 5 which is provided with ways 24 upon which the slide is moveable in a direction parallel to the wire 14. The top of the slide 22 has formed thereon ways 25 upon which the slide 23 moves in a direction at right angles to the motion of the slide 22. Thus the slide 23 rides upon the slide 22. The sole purpose of the bottom slide is to provide feeding motion lengthwise of the wire for the upper slide 23.

The slide 23 has mounted thereon a pair of wire grippers 26 and a cutter member 27. These members may have any suitable construction. As shown the inner wall of the slide is provided with a pair of bosses 28 to receive a horizontal shaft 29 upon which the grippers and cutter knife are rotatably mounted.

Figure 6:
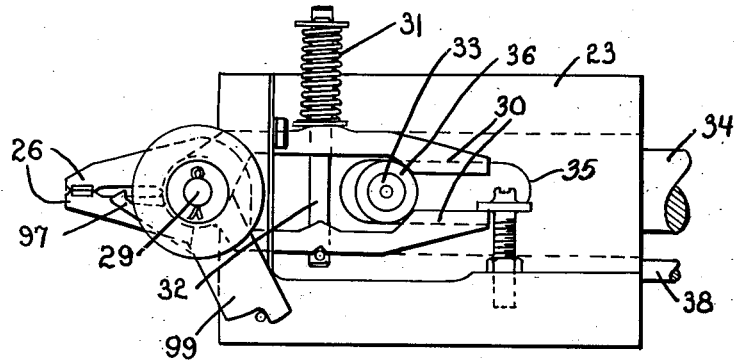
Fig. 6 is a detail side view of the mechanism for operating the wire grippers.

The grippers desirably are constructed to function as a conventional pincers and are provided with actuator arms 30 (Figs. 1 and 6) which extend along one side of the slide. Normally the grippers are held closed by a spring 31. The spring is received upon a stud 32 extending through both arms 30. The lower end of the stud has a laterally extending pin therein engaging and exerting an upward pressure upon the lower arm while the spring itself bears downward upon the upper arm.

Means are provided to open the grippers to permit them to embrace the wire at the proper time in the wire feeding cycle. Such means comprises a stud 33 fixed in and extending laterally from a rod 34 which in turn is axially moveable within and parallel to the movement of the slide 23 itself. The stud 33 projects through an elongated aperture 35 in the side of the slide and between the arms 30 of the pincers. Desirably the stud has a roll 36 thereon which engages the arms 30. When the rod 34 is in its innermost position the spring 31 acts to close the grippers. When the rod is drawn outward the roll 36 spreads the arms 30 to open the grippers.

The cutter 27 (Fig. 8) is mounted on the shaft 29 with its cutting blade in contact with the grippers 26 and coacts therewith to sever the wire with a shearing action. The cutter is provided with a downwardly extending foot portion 37 which is engaged by the inner end of a rod 38 moveable in the slide 23 parallel to the rod 34.

Figure 8:
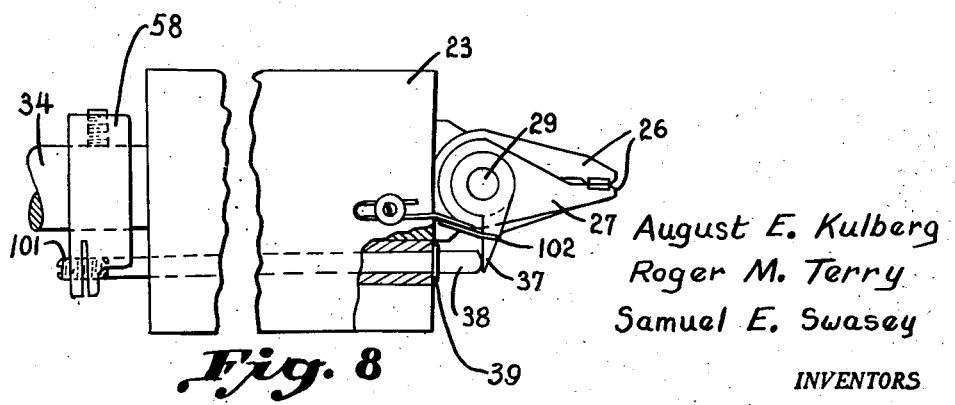
Fig. 8 is a detail view showing the elements employed to cut the wire.

The rod 38 extends through and beyond the back face of the slide where it is engaged by the elements which actuate the slide in a manner to be described hereinafter. The cutter 27 is held in inoperative position by a spring 39 (Fig. 8).

The slide 23 is held in its innermost position by a pair of springs 40 (Figs. 1 and 3) connected at one end to the slide and to fixed points on the machine at their other ends. The slide 23 may be actuated in any suitable manner. As shown it is operated by a cam mounted upon a main cam shaft of the stem fabricating machine. All the other moving elements of the apparatus are also driven by cams mounted on the shafts 1 and 2 as will appear hereinafter.

The slide 23 is actuated by the cam 41 mounted on the camshaft 2 (Figs. 3, 4, and 5, particularly Fig. 5). The cam 41 engages and actuates a lever 42 mounted upon the fulcrum shaft 43. The arm 44 of the lever has pivoted thereto a connecting link 45. The lever 42 is held in contact with the cam by means of a tension spring 46 fixed at one end and connected to the link 45 at its other end.

The link 45 (Figs. 1 and 3) is pivoted at its upper end to bell crank lever 49 which in turn is connected to the rod 34. The pivots on both arms of the lever 49 are universally flexible. The upper arm of the lever is bifurcated to embrace the rod 34 and the bifurcated arms themselves are slotted to receive a pair of rolls 47 which are mounted on a pin 48 extending through the rod. As will appear hereinafter movement of the slide 23 laterally of the wire is finally effected by locking the slide to rod 34 in a manner to be described.

The wire feeding movement which takes place longitudinally of the wire is accomplished through movement of the slide 22. This movement is derived from the cam 149 shown in Fig. 4 and Fig. 5 and mounted on the cam shaft 2. Motion from this cam is transmitted to a lever arm 50 rotating upon the fulcrum shaft 51. The arm 50 has pivoted thereto a link 52 extending upward and pivoted to a bell crank lever 53 fulcrumed at 54 (Figs. 1, 3 and 5) and having a vertical arm 55 which extends upward through the ways 24 and into an aperture 56 (Figs. 1 and 5) in the slide. The arm 55 is bifurcated and embraces a roll 57 pivoted in the aperture 56. Thus the slide 22 and consequently the slide 23 is moved parallel to the wire at the required time by the correct timing of the cam 149. Desirably the pivot connections at the top and bottom of the various links described are of a type which have, in addition to their main pivots, a limited universal or ball and socket movement.

At certain periods in the machine cycle it is necessary that the rod 34 (Fig. 3) be drawn out by the lever 49 without moving the carriage 23. When this occurs the grippers 26 will be opened in the manner explained above. At other times the rod and the slide must be drawn backward together. To accomplish this result the rod 34 is provided with a collar 58 (Figs. 1, 3, 5 and 8) secured thereto and having a projection 59 which extends into the path of a swinging dog member 60. The member 60 is pivoted upon the slide 23 at 61. Its inner end swings into and out of the path of the projection on the collar 58. The outer end of the dog member has pivoted thereto a link 62 (Figs. 3, 4 and 5) extending downward and pivoted to a lever 63 fulcrumed on the shaft 64 and having an arm 65 engaging a cam 66 keyed to the cam shaft 1 (Fig. 5). The cam 66 is designed and timed to actuate the dog 60 at the required time. The arm 65 is held upon the cam by a spring 67 secured between a fixed member on the machine and a collar on the link 62.

The mechanism thus far described executes the filament wire feeding operation which places a section of wire in approximate mounting position with respect to the lead wires upon the assembly mount 9. The sequence of operations of all the elements will be described hereinafter.

The following portions of the mechanism have to do with the final and accurate location of the wire in mounting position and the securing of the wire to the leads 11.

The wire mounting mechanism is mounted upon a slide 68 mounted for vertical movement in ways formed in the standard 6 (Figs. 1, 3 and 5). The slide 68 has a pair of bosses 69 projecting outward therefrom which is provided with a pivot pin 70 upon which are mounted a pair of tongs like members 71 the upper arms of which are provided with an anvil 72 and a swaging tool 73 respectively. The lower arms of the member 71 are provided with rolls 74 between which moves a wedge member 75. The members 71 are so constructed that when the wedge 75 moves the rolls 74 outward the swage and anvil close upon the two lead wires 11 and the wire 14 which at the time of swaging lies in the notches 10 (Fig. 13). The swage molds the metal along the sides of the notches around the wire as shown in Fig. 14 of the drawings. Thus a very strong and low electrical resistance union is made between the leads 11 and the wire 14.

An important feature of the invention is a special device for accurately and consistently placing the wire in its mounting position on the lead wires whether or not the lead wires have notches therein. The filament wire may for example be secured to the lead wires in any suitable manner as by providing a loop therein to be pinched to the wire or by a special swaging tool requiring no notch. The positioning means comprises broadly a gauging abutment to position the lead wires and another abutment or system of abutments for positioning the wire exactly in a plane intersecting the mounting position on the lead wires. The two gauging devices having a fixed spaced relationship to insure accurate consistent positioning of the filament upon the leads. Any suitable means are provided for moving the wire positioning means into and out of operating position as required by the timing of the machine cycle.

A specific form of the positioning means is shown in the drawings wherein the gauging devices are formed upon the inner end of a substantially horizontal bar 76 (Figs. 1 and 11). To accurately set the apparatus for best operation a fine adjustment of the height of the positioning means is desirable. To accomplish this result the bar 76 is pivoted at its outer end at 77 (Fig. 1) in a rigid bracket 78 fixed upon the slide 68. The inner end of the bar is held by a screw 79 passing therethrough and threaded into the bracket 78. A relatively heavy spring 80 (Fig. 11) urges the arm upward to engage the head of the screw. The arm is adjusted by turning the screw. Thus a predetermined relationship can be established and maintained between the swaging means and the wire positioning means to insure the swaging tool 72 will engage the notches centrally (Fig. 13).

The slide 68 is raised and lowered from active to inacting position by a cam 81 (Figs. 3, 4 and 5) which actuates a lever 82 fulcrumed on the shaft 43. The lever 82 has pivoted thereto a link 83 extending up to and pivoted upon the slide 68 at 84. Desirably the length of the link 83 is adjusted to cause the cam 81 to raise the slide 68 to such height that it will engage the wire 14 and raise it slightly along with the stem which will move upward through its holding members 12 (Figs. 11 and 12).

The inner end of the bar 76 (Figs. 9–12) at the filament mounting position has a channel formed therein sufficiently wide to embrace the lead wires 11 and presents a bottom surface 85 which acts as a gauging surface for the lead wires. The channel also presents wire gauging and guiding surfaces 86 at the top of the channel walls. The distance between the planes of the surfaces 86 and the surface 85 is equal to the distance from the ends of the lead wires to the center of the notches 10.

The rolls 74 of the swaging mechanism are urged inward by a tension spring 87 (Figs. 3 and 5) connected between the lower arms of the members 71. The wedge 75 is operated from a cam 88 keyed to the shaft 1 actuating a lever 89 fulcrumed on the shaft 64. The lever has universally pivoted thereto a link 90 the upper end of which is universally pivoted to a rod 91 vertically movable in a guiding journal 92 (Fig. 3). The wedge 75 is secured upon the top of the rod 91. The extent of its upward travel and consequently the degree of swaging can be accurately adjusted by lengthening or shortening the link 90 by any suitable means such as a threaded union 93 having a locknut.

Each one of the cam levers are held upon their cams by suitable spring means (Fig. 5). The spring 94 is connected to the link 52 to hold the lever 50 on the cam 149. The spring 95 is connected to the link 90 to hold the lever 89 upon the cam 88. The spring 96 is connected to the link 83 to hold the lever 82 upon the cam 81. Also suitable giveway connections are inserted in the various links to prevent jamming the mechanism.

Figure 7:
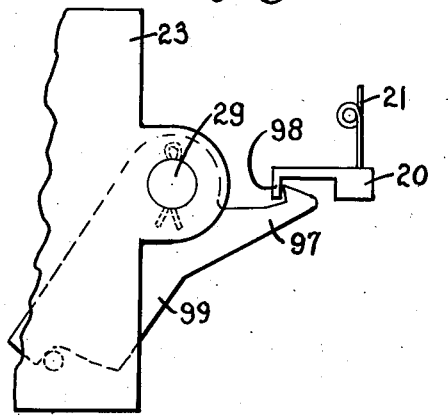
Fig. 7 is a detail view showing the means for protecting the filament wire against breakage from lateral stresses.

A further means is provided for the control and protection of the wire. When a stem 9 is indexed into its filament mounting position the wire must be moved back to permit the stem to swing into place. In the normal operation of the apparatus the slide 23 is moved backward before the wire feed takes place an amount sufficient to clear the wire for indexing. When this is done the arm 20 must be moved back also by some positive means since the delicacy of the wire will not permit the contact of the wire with the eyelet 21 to be relied upon for that purpose. A latch member 97 shown in Fig. 7 is pivoted upon the shaft 29 on the slide 23 and is so positioned that it will interlock with an abutment 98 upon the end of the arm 20 when the slide 23 is moved to its extreme inner position. Sufficient latching force is provided by a counterweight 99 which normally rests against a stop to correctly position the latch. A light spring or any suitable means may be provided to load the latch in place of the counterweight.

When the slide 23 is moved outward the arm is drawn out by the latch and the wire held by the grippers 26 is thus moved out with no tendency toward breakage. When the wire feed takes place the latch moves out from behind the abutment thus freeing the arm from further control until the grippers are returned to feed more wire for a subsequent filament mounting operation.

A further function of the latch mechanism is to protect the wire in the event no stem assembly is presented or a defective one is fed to the mount mechanism. In such an event the wire feeding portion of the cycle is prevented by a suitable mechanism which does not form a part of the present invention. However in such an event the carriage 23 is retracted to its fullest extent during which time the arm 20 is swung back by the latch 97.

A feature of the invention resides in its ability to handle the extremely fine filament wire used in flash lamps without fouling or breaking it. This is partly due to the efficiency and smooth operation of the mechanism but is chiefly due to the fact that a firm grip is continuously maintained upon the wire and its end portion is never released at any point in the machine cycle as will fully appear from the following description of the operation of the apparatus.

The operation of the device is as follows. It will be assumed at the outset that the mechanism has just completed the mounting of the filament wire upon the leads 11 and the grippers 26 have been moved into their initial wire feeding position and are gripping the wire as shown in Fig. 9. The cutter 27 acts immediately after the wire is gripped as will appear hereinafter. The stem with the mounted filament is then indexed away from mounting position and another stem is moved into mounting position. At this time also the positioner 76 is at the bottom of its travel.

The next major event in the cycle is the feeding of the wire into approximate mounting position. This is accomplished by the cam 149 which acts through its connecting elements to move the slide 22 and consequently the slide 23 and gripper 26 to the right thus drawing a section of wire from the spool 15 and placing it slightly below the mounting plane and in front of the lead wires as shown in Fig. 10 of the drawings. The positioning member 76 now starts upward under the action of its cam 81. The gauging surfaces 86 engage the wire and carry it upward. This upward movement of the member also causes the gauging surface 85 to engage the ends of the stem lead wires 11. If the lead wires are below their correct mounting position the whole stem is moved upward to its correct position as shown in Fig. 11. By reason of the wire resting upon the surfaces 86 it is automatically and accurately placed upon the mounting plane intersecting the notches 10.

At this time the carriage 23 has started moving inward under the action of its cam 41 and connecting members. At the end of its inward stroke the grippers have carried the wire across the surfaces 86 and into the notches 10 as shown in Fig. 12. The anvil 72 and swaging tool 73 have also moved up with the positioner 76 but at this time are separated as shown in Fig. 13. The inward movement of the grippers carries the wire along the centerline of the notches thus preventing snagging of the wire upon the edges thereof. Continued inward motion of the grippers tightens the filament across the leads and positively positions it at the bottom of the notches. At this time the wire extending outside and beyond both lead wires is held in an angular line as shown diagrammatically in Fig. 15 and this disposition of the wire is maintained during the staking or swaging operation which operation takes place immediately after the wire is correctly positioned. The swaging is effected by the cam 88 acting through its connections to raise the wedge 75 thus closing the upper arms of the members 71 to perform the swaging operation.

Up to the time just prior to the swaging operation the grippers have continuously held the wire and after the swaging operation it is held by the lead wires but is not yet severed so it is still entirely under the control of the mechanism.

At this time the dog 60 is swung into a position out of the path of the projection 59 after which the cam 41 acts through its connection to pull the rod 34 outward. By so doing the stud 33 acts to force the arms 30 of the gripper apart thereby releasing the grippers from the wire. Further movement of the rod carries the slide 23 with it by reason of the engagement of the member 59 with a fixed stop 60-a (Figs. 1 and 5) on the slide 23 freeing the grippers entirely from the wire and other elements. The cam 149 through its connections now moves the slide 22 and the slide 23 from their right hand position to their left hand position. The outward movement of the carriage 23 has also placed the springs 49 under tension.

The cam 41 now causes the slide to move toward the wire under the action of the springs thus the grippers are held open by reason of the presence of the stud 33 between the arms 30 of the grippers. When the slide has reached the end of its inward travel it meets a stop 100 (Fig. 3) after which further movement induced by the cam 41 forces the rod 34 inward which moves the stud 33 out from between the arms 30 thereby closing the grippers upon the wire. The grippers at this time have reached a position embracing the wire.

The final inward movement of the rod 34 (Fig. 8) causes the collar 58 to actuate the rod 38 which in turn actuates the cutter through its foot portion 37. Desirably the collar has an adjustable set screw 101 therein to engage the rod 38. The cutter is held in inactive position by a spring 39 which acts upon the foot 37 which in turn engages the rod 38, the retractive movement of which is limited by a stop collar 103.

The gripper 26 acts before the cutter. Thus the end of the wire leading to the spool is gripped and held before the wire is cut. After the wire is cut another cycle of operation is initiated.

What we claim is:

1. In combination with a carrier having a plurality of stem holding heads mounted thereon for carrying a stem, having a pair of lead wires depending therefrom, to a plurality of work stations, a filament mounting apparatus disposed at one of said work stations adjacent to the path of travel of said heads comprising: a slide; fixed means disposed adjacent to said slide for supporting a supply of filament wire; a pair of grippers mounted on said slide for holding taut an end of said filament wire; a wire cutter mounted on said slide adjacent to said grippers; means for reciprocating said slide to unwind filament wire from the supply thereof; means for reciprocating said slide transversely to the path of said first reciprocating motion thereof to carry the unwound filament wire into engagement with the lead wires of a stem disposed at the filament mounting station; means disposed adjacent to and in register with a stem holding head at the filament mounting station for securing the filament wire to the lead wires; and means for actuating said wire cutter to sever that portion of the filament wire which is attached to the lead wires from the supply thereof.

2. In combination with a carrier having a plurality of stem holding heads mounted thereon for carrying a stem, having a pair of lead wires depending therefrom, to a plurality of work stations, a filament mounting apparatus disposed at one of said work stations adjacent to the path of travel of said heads comprising: a first reciprocable slide; a second reciprocable slide transversely mounted on said first reciprocable slide; fixed means disposed adjacent to said second slide for supporting a supply of filament wire; a pair of grippers mounted on said second slide for holding taut an end of said filament wire; a wire cutter mounted on said second slide adjacent to said grippers; means for advancing said first slide to unwind filament wire from the supply thereof; means for advancing said second slide transversely of said first slide when said first slide is in its advanced position to carry the unwound filament wire into engagement with the lead wires of a stem disposed at the filament mounting station; means disposed adjacent to and in register with a stem holding head at the filament mounting station for securing the filament wire to the lead wires; means for disengaging said grippers from the filament wire; means for retracting said second slide transversely of said first slide when said first slide is in its advanced position; means for retracting said first slide when said second slide is in its retracted position; means for advancing said second slide when said first slide is in its retracted position to move said grippers into proximity to the filament wire; means for actuating said grippers into gripping engagement with the filament wire; means for subsequently actuating said wire cutter to sever that portion of the filament wire which has been secured to the lead wires from the supply thereof; and means for retracting said second slide when said first slide is in its retracted position to withdraw said grippers from the path of travel of said heads.

3. In combination with a carrier having a plurality of stem holding heads mounted thereon for carrying a stem having a pair of lead wires depending therefrom, to a plurality of work stations, a filament mounting apparatus disposed at one of said work stations adjacent to the path of travel of said heads comprising: a slide mounted for reciprocation longitudinally and transversely; fixed means disposed adjacent to said slide for supporting a supply of filament wire; a pair of grippers mounted on said slide for holding taut an end of said filament wire; a wire cutter mounted on said slide adjacent to said grippers; means for advancing said slide longitudinally to unwind filament wire from the supply thereof; means for advancing said slide transversely to carry the unwound filament wire into engagement with the lead wires; means disposed beneath and in register with a stem holding head at the filament mounting station for securing the filament wire to the lead wires; means for disengaging said grippers from the end of the filament wire; means for retracting said slide transversely; means for retracting said slide longitudinally; means for advancing said slide transversely to bring said grippers into proximity to the unwound filament wire; means for actuating said grippers into gripping engagement with the unwound filament wire; means for actuating said cutter to sever that portion of the filament wire which has been secured to the lead wires from the supply thereof; and means for retracting said slide transversely to withdraw said grippers from the path of travel of said heads.

4. In combination with a carrier having a plurality of stem holding heads mounted thereon for carrying a stem, having a pair of lead wires depending therefrom, to a plurality of work stations, a filament mounting apparatus disposed at one of said work stations adjacent to the path of travel of said heads comprising: a first standard disposed on one side of the path through which the heads travel; a second standard disposed on the other side of the path through which the heads travel; a first slide mounted on said first standard for reciprocation longitudinally and transversely in a horizontal plane; an arm fixedly mounted on said first standard adjacent to said first slide for supporting a supply of filament wire; a pair of grippers mounted on said first slide for holding taut an end of said filament wire; a wire cutter mounted on said first slide adjacent to said grippers; a second slide mounted on said second standard for reciprocation in a vertical plane and disposed beneath and in register with a stem holding head at the filament mounting station; means mounted on said second slide for securing the filament wire to the lead wires; means mounted on said second slide for positioning the filament wire and the lead wires with refeernce to one another; means for advancing said first slide longitudinally to unwind filament wire from the supply thereof; means for advancing said second slide to bring the means for positioning the filament wire and the lead wires into engagement therewith; means for advancing said first slide transversely to carry the unwound filament wire into engagement with the lead wires; means for actuating said means for securing the filament wire to the lead wires to effect attachment of the filament wire to the lead wires; means for releasing said grippers from engagement with the end of the filament wire; means for retracting said second slide; means for retracting said first slide transversely; means for retracting said first slide longitudinally; means for advancing said first slide transversely to place said grippers in proximity to the unwound filament wire; means for actuating said grippers into gripping engagement with the unwound filament wire; means for actuating said wire cutter to sever that portion of the unwound filament wire attached to the lead wires from the supply thereof; and means for retracting said first slide transversely to return it to starting position.

AUGUST E. KULBERG.
  ROGER M. TERRY.
  SAMUEL E. SWASEY.

References Cited in the file of this patent

UNITED STATES PATENTS

| Number | Name | Date |
|---|---|---|
| 1,593,824 | Higgins | July 27, 1926 |
| 1,728,048 | Flaws | Sept. 10, 1929 |
| 1,821,894 | Otaka | Sept. 1, 1931 |
| 1,907,532 | Flaws | May 9, 1933 |
| 2,208,970 | Geiger | July 23, 1940 |
| 2,327,033 | Flaws | Aug. 17, 1943 |
| 2,380,742 | Flaws | July 31, 1945 |